(12) United States Patent
Watzke et al.

(10) Patent No.: US 9,110,947 B1
(45) Date of Patent: Aug. 18, 2015

(54) COLUMN-ORIENTED TASK EXECUTION IN A ROW-PARTITIONED DATABASE SYSTEM

(75) Inventors: Michael Watzke, Madison, WI (US); Bhashyam Ramesh, Secunderbad (IN)

(73) Assignee: Teradata US, Inc., Dayton, OH (US)

( * ) Notice: Subject to any disclaimer, the term of this patent is extended or adjusted under 35 U.S.C. 154(b) by 200 days.

(21) Appl. No.: 13/618,875

(22) Filed: Sep. 14, 2012

Related U.S. Application Data

(60) Provisional application No. 61/582,242, filed on Dec. 30, 2011.

(51) Int. Cl.
  *G06F 17/00* (2006.01)
  *G06F 17/30* (2006.01)
(52) U.S. Cl.
  CPC .... *G06F 17/30445* (2013.01); *G06F 17/30486* (2013.01)
(58) Field of Classification Search
  CPC .................................................. G06F 17/30486
  See application file for complete search history.

(56) References Cited

U.S. PATENT DOCUMENTS

| | | | | |
|---|---|---|---|---|
| 4,412,285 | A * | 10/1983 | Neches et al. | 709/252 |
| 7,249,118 | B2 * | 7/2007 | Sandler et al. | 1/1 |
| 7,386,554 | B2 * | 6/2008 | Ripley et al. | 1/1 |
| 8,583,692 | B2 * | 11/2013 | Ganesh et al. | 707/796 |
| 2011/0029569 | A1 * | 2/2011 | Ganesh et al. | 707/796 |
| 2013/0166556 | A1 * | 6/2013 | Baeumges et al. | 707/737 |

OTHER PUBLICATIONS

Morales et al, VLDB and Partitioning Guide Jul. 7, Oracle Sys Inc, 216 pages.*
Scheuermann et al, Data partitioning and load balancing in parallel disk systems 1998, Springer-Verlag, The VLDB Journal 7, pp. 48-66.*
Rouse et al., virtual CPU (vCPU) Apr. 14, techtarget.com, http://whatis.techtarget.com/definition/virtual-CPU-vCPU.*
Virtual processor—Google Search 9 Jul. 14, google.com, https://www.google.com/?gws_rd=ssl#q=virtual+processor.*
Gamper, Chapter 3: Distributed Database Design 2008-09, Free University of Bozen-Bolzano, http://www.inf.unibz.it/dis/teaching/DDB/ln/ddb03.pdf.*
Teradata Columnar Sep. 11, Teradata Labs, www.monash.com/uploads/Teradata-Columnar-September-2011.ppt.*

* cited by examiner

*Primary Examiner* — Jason Liao
(74) *Attorney, Agent, or Firm* — Randy L. Campbell, Jr.

(57) ABSTRACT

A database system may process multiple column-oriented tasks in parallel for a database being stored according to a row-partitioning protocol. The database system may determine when the query should process the column-oriented task serially or in parallel. For parallel processing, the database system may generate processing tasks for each unique column-oriented task contained in the query used to retrieve column data and to process the column data according to the column-oriented tasks requested. A method of operating the database system may determine that multiple column-oriented tasks included in a query are to be processed in parallel. The method may further include generating a processing task for each unique column-oriented task included in the query. The method may further include performing the column-oriented tasks in parallel based on the processing threads. The method may implement various considerations in determining to process to the column-oriented tasks in parallel.

21 Claims, 7 Drawing Sheets

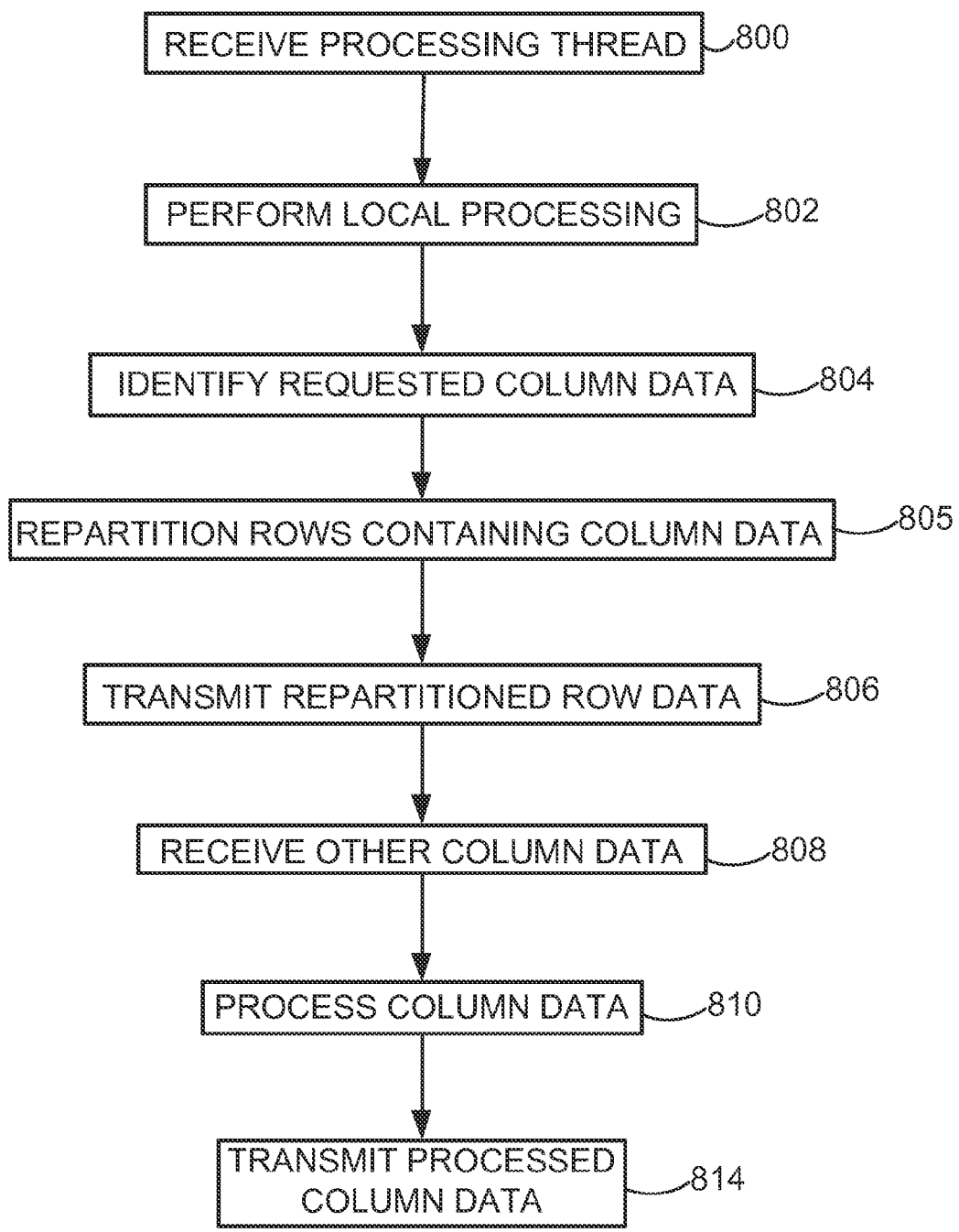

COLUMN-ORIENTED TASK EXECUTION IN A ROW-PARTITIONED DATABASE SYSTEM

CLAIM OF PRIORITY

This application claims the benefit of priority under 35 U.S.C. §119(e) to U.S. Provisional Patent Application Ser. No. 61/582,242 filed on Dec. 30, 2011, which is hereby incorporated by reference herein in its entirety.

BACKGROUND

1. Technical Field

The present disclosure relates generally to processing queries in a database, and more particularly to, processing queries that include column-oriented tasks in a row-partitioned database.

2. Related Art

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In some RBDMSs, relational tables are stored by rows, known as a row-partitioning format. In such a system, queries may be received that require specific columns in the relational tables to be used in some capacity. However, these systems require that entire rows containing the rows of the specific columns be processed in order to carry out the column-related tasks. Processing the rows in such a manner may also require that each task related to a specific column be read and processed serially from the query causing not only a reduction in response time due to performing column-related tasks to row-partitioned data, but also due to the multiple reads involved.

SUMMARY

In one aspect of the present disclosure, a database system may process multiple column-oriented tasks in parallel for a database being stored according to a row-partitioning protocol. The database system may determine if the query should process the column-oriented task serially or in parallel. The determination may depend on one or more conditions associated with the column-oriented tasks.

To process the column-oriented tasks in parallel, the database system may generate a processing task for each unique column-oriented task contained in the query. Each processing task may be used by the database system to retrieve rows from the database containing the columns relevant to the column-oriented tasks and to process the column data according to the column-oriented tasks requested. The database system may perform the processing of column-data in a parallel fashion to generate results to be included in the results set of the query to be returned to the source of the query.

According to another aspect of the disclosure, a method of operating a database system may include receiving a query that includes the multiple column-oriented tasks associated with data tables stored according to a row-partitioning protocol. The method may further include generating a processing task for each unique column-oriented task included in the query. The method may further include, through implementation of the processing tasks, retrieving data rows from the row-partitioned database associated with the columns relevant to the column-oriented tasks. The method may further include performing the column-oriented tasks in parallel based on the processing threads. The method may implement various considerations in determining to process to the column-oriented tasks in parallel. Such determination may be based on various considerations associated with the column-oriented tasks.

According to another aspect of the disclosure, a computer-readable medium may be encoded with computer-executable instructions executable by a processor. The computer-readable medium may include instructions to receive a query that includes requested actions to be performed on a plurality of data columns. The computer-readable medium may further include instructions to generate a processing task for each unique requested action based on a predetermined threshold. The predetermined threshold may be related to one or more various considerations.

The computer-readable medium may further include instructions to retrieve, in response to the processing threads, data rows from the row-partitioned database associated with the columns relevant to the column-oriented tasks. The computer-readable medium may further include instructions to perform the requested actions based on the processing tasks.

According to another aspect of the disclosure, a method of operating a virtual processor of a database system storing a plurality of data tables according to a row-partitioning protocol may include receiving, with the virtual processor, a processing thread with the virtual processor, retrieving at least one data column from a data row of one of the data tables. The method may further include transmitting a first data column portion to another virtual processor according to the first processing thread. The method may further include receiving a second data column portion. The method may further include receiving a second processing thread. The method may further include processing the second data column portion according to the second processing thread.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 8 is an example operational flow diagram of a virtual processor of the database system of FIG. 1.

DETAILED DESCRIPTION OF THE FIGURES

A database management technique may allow columnar partitioning to be implemented in a row-partitioned-based database system to more efficiently respond to a query that includes column-oriented tasks. A database management system may analyze a query including column-oriented tasks to determine when repartitioning row-partitioned data into columnar partitions in order to perform the column-oriented task is desirable as compared to entire rows. Based on various considerations, a determination by the database management system to reparation the rows of the column-specific data may result in a processing task being generated for each unique column-oriented task identified in the query. Each processing task may be used to direct retrieval of rows containing column data needed to meet the request, as well as, repartitioning the rows and to process column-specific data in order to generate a results set to the query.

Figure 1:
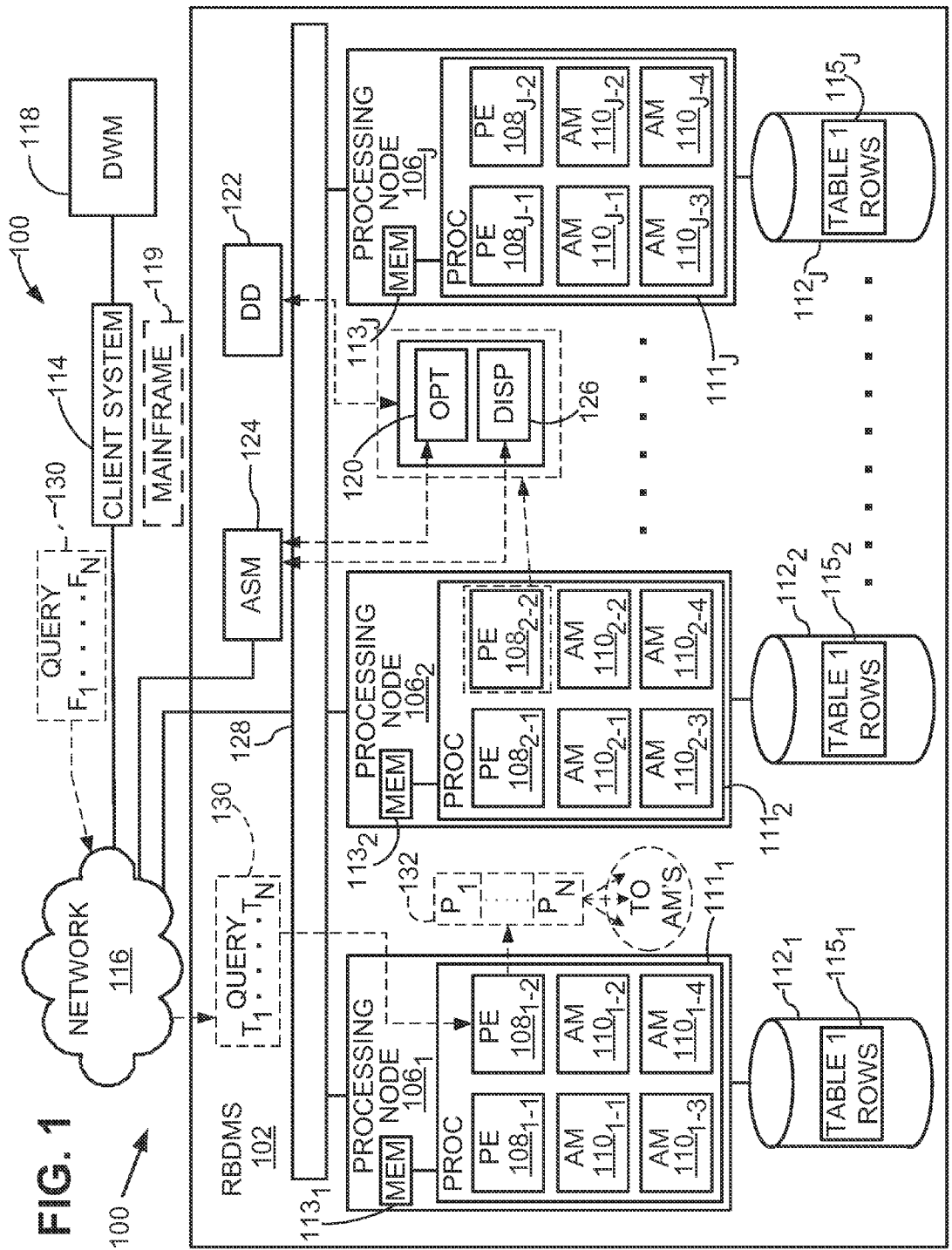
FIG. 1 is a block diagram of an example database system.

FIG. 1 is a diagrammatic representation of example architecture for a database system 100, such as a Teradata Active Data Warehousing System®, that is suited for implementing queries involving such column-oriented tasks for a database being stored as tables according to row-partitioning storage techniques. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration.

The RBDMS 102 may include one or more processing units used to manage the storage, retrieval, and manipulation of data in the data-storage facilities. The array of processing units may include an array of processing nodes 106 that manage the storage, retrieval, and manipulation of data included in a database. In FIG. 1, the processing nodes 106 are individually indexed as 1 through J, where J may represent the total number of processing nodes 106 in the database system 100 or, alternatively, may represent the total number of active processing nodes 106 in the database system. Such indexing is used consistently throughout the present disclosure regarding other features and components described herein.

In one example, each processing node 106 may include one or more physical processors 111 and memory 113. The memory 113 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 111 such as multiprocessing, multitasking, parallel processing and the like, for example.

The processing nodes 106 may include one or more other processing unit arrays such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 111 included in the respective processing node 106. In FIG. 1, each parsing engine module 108 and access module 110 is individually indexed as a number pair (e.g., 1-1) for ease of reference, where the first number of each number pair references the processing node index and the second number of the number pair indicates the particular parsing engine module 108 or access module 110 of the respective processing node 106. In FIG. 1, each processing node 106 is shown as including multiple parsing engine modules 108 and access modules 110, such that there are more parsing engine modules 108 and access modules 110 than processing nodes 106. In one example, during operation, the one or more physical processors 111 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in data-storage facilities 112. In one example, rows 115 of a table, "Table 1," are distributed across the data storage facilities 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities 112 and associated processing modules 110 by a hash bucket map. The characteristics of the columns chosen for the primary index determine how evenly the rows are distributed.

Rows of each stored table may be stored across multiple data-storage facilities 112. In FIG. 1, the data storage facilities 112 are individually indexed as 1 through J to illustrate correspondence with each processing node 106. Each parsing engine module 108 may organize the storage of data and the distribution of table rows. The parsing engine modules 108 may also coordinate the retrieval of data from the data-storage facilities 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, may apply an optimizer module 120 to assess the best plan for execution of the query. An example of an optimizer module 120 is shown in FIG. 1 with regard to parsing engine module $108_{2-2}$. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 402 (see FIG. 4), and/or optimizer module 120 may access a data dictionary module 122, shown in FIG. 1 specifically for parsing engine module $108_{2-2}$ for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL.

The RBDMS 102 may include an active system management (ASM) module 124. The ASM module 124 may be implemented as a "closed-loop" system management (CLSM) architecture capable of satisfying a set of workload-specific goals. In other words, the RBDMS 102 is a goal-oriented workload management system capable of supporting complex workloads and capable of self-adjusting to various types of workloads. The ASM module 124 may communicate with each optimizer module 120 (as shown in FIG. 1 for parsing engine module $108_{2-2}$) and is adapted to convey a confidence threshold parameter and associated parameters to the optimizer module 120 in communication. Further, the ASM module 124 may communicate with a dispatcher module 126 of each parsing engine module 108 (as shown in detail FIG. 1 for parsing engine module $108_{2-2}$) to receive query execution plan costs therefrom, and to facilitate query exception monitoring and automated modifications of confidence threshold parameters in accordance with disclosed embodiments. Further, the DWM client 118 may communicate with the ASM module 124 via the network 116.

The ASM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the ASM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 113 and processors 111 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

As previously described, database information may be stored in the data-storage facilities 112 as tables of data. In one example, the data-storage facilities 112 of FIG. 1 may be virtual disks (vdisks). The term "virtual disks" may refer to specific groups of memory locations distributed across physical memory devices, such as flash drives, hard drives, or some combination thereof, for example. In one example, the parallel processing aspect of the RBDMS 102 may include a "shared nothing" functionality that allocates specific memory locations to each individual access module 110. The specific memory locations may exist in a single physical memory device or be distributed among various physical memory devices. In one example, the allocated memory locations may be exclusively associated with an individual access module 110 such that no access modules 110 are given access to memory locations allocated to other access modules 110 during operation of the database system 100. Thus, for purposes of illustration in FIG. 1, each data-storage facility 112 may include the memory locations allocated to the access modules 110 of the associated processing node 106.

In storing tables making up a database, the database system 100 may use row partitioning, such that each table is broken down into rows and stored across the data-storage facilities 112. Row partitioning may be used in conjunction with the shared-nothing functionality such that each access module 110 is responsible for accessing only the rows of stored tables in the specifically-allocated memory locations. For example, each data storage facility 112 is shown in FIG. 1 as storing rows 115 for Table 1. Depending on the row partitioning for Table 1, rows 115 from Table 1 may be stored in memory locations allocated to each of the access modules 110 as further discussed with regard to FIG. 2.

Figure 2:
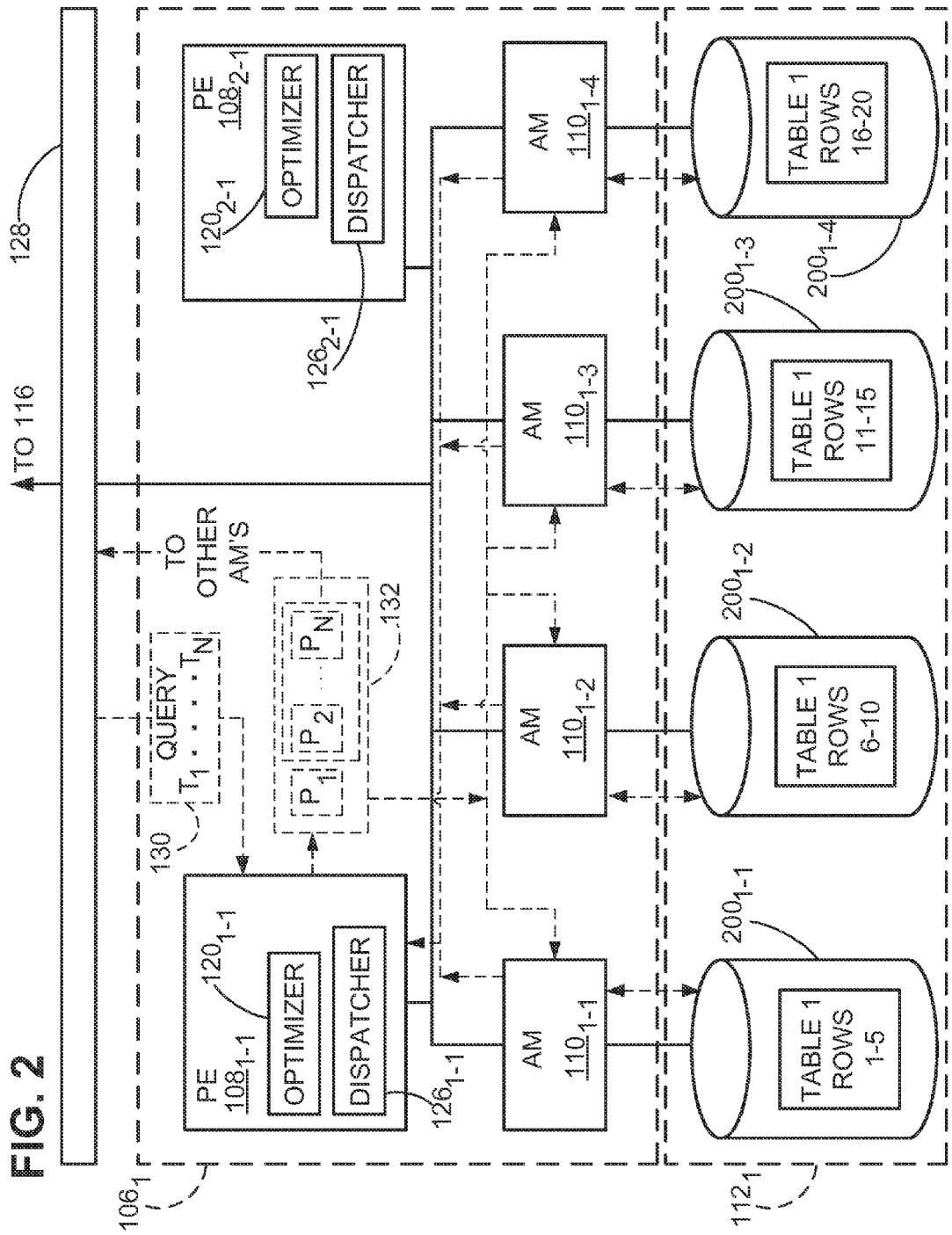
FIG. 2 is a block diagram of a portion of the example database system of FIG. 1.

FIG. 2 is a diagrammatic representation of an example of the processing node $106_1$. As discussed with regard to FIG. 1, the interconnection 128 may provide a medium of communication for the parsing engine modules 108 and the access modules 110. This is depicted in FIG. 2 through use of a line connecting each parsing engine module 108 and access module 110 of the processing node $106_1$ to the interconnection 128.

In FIG. 2, the data storage facilities $112_1$ are depicted as being separate data-storage facilities $200_{1-1}$ through $200_{1-4}$. Each data-storage facility 200 may represent the specific memory locations allocated to the corresponding processing module 110. As previously discussed, memory locations allocated to a particular access module 110 may be distributed across numerous memory devices or may be included in a single memory device. As an example of this storage technique, in FIG. 2, each access module 110 is shown as being associated with particular rows 115 of the example Table 1. In this example, each access module 110 stores five rows of Table 1. The example of FIG. 2 is for purposes of illustration and should be considered as non-limiting. In alternative examples, any number of rows 115 of Table 1 may be associated with a particular access module 110 having with the appropriate capacity in the associated data-storage facilities 200. Such tables may contain millions or more of rows to be distributed among the data-storage facilities 112. Row storage need not require that consecutive rows of a particular table be stored in consecutive memory spaces. Various considerations may be applied when partitioning rows to be stored in the data storage facilities 200. For example, distribution of rows amongst the processing modules 110 for a particular table may be performed as evenly as possible in an effort to balance the processing times of the parallel-processing access modules 110 when the rows of the particular table are being retrieved and processed.

Figure 4:
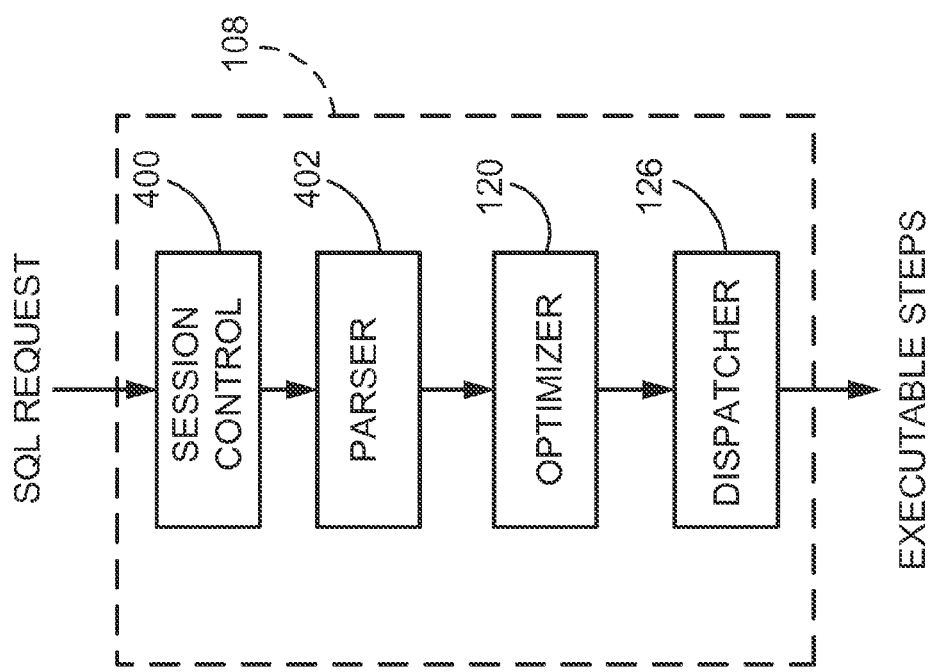
FIG. 4 is a block diagram of another portion of the example database system of FIG. 1.

In one example system, each parsing engine module 108 includes three primary components: a session control module 400, a parser module 402, and a dispatcher module 126 as shown in FIG. 4. The session control module 400 provides the logon and logoff functions. It accepts a request for authorization to access the database, verifies it, and then either allows or disallows the access. Once the session control module 400 allows a session to begin, an SQL request may be received such as through submission by a user and the SQL request is routed to the parser module 402.

Figure 5:
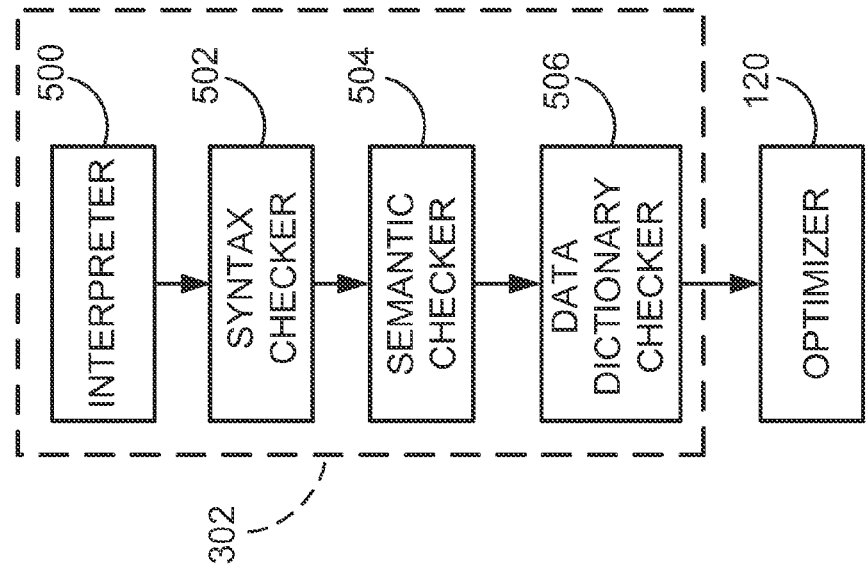
FIG. 5 is a block diagram of another portion of the example database system of FIG. 1.

As illustrated in FIG. 5, the parser module 402 may include an interpreter module 500 that interprets the SQL request. The parser module 402 may also include a syntax checker module 502 that checks the request for correct SQL syntax, as well as a semantic checker module 504 that evaluates the request semantically. The parser module 402 may additionally include a data dictionary checker 506 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the ASM 124 is configured to monitor runtime exception criteria. The ASM 124 monitoring takes place by communicating with the dispatcher module 126 as it checks the query execution step responses from the access modules 110. The step responses include the actual cost information, which the dispatcher module 126 may then communicate to the ASM 124 which, in turn, compares the actual cost information with the estimated costs of the optimizer module 120.

The RBDMS 102 described with regard to FIGS. 1 through 5 may allow multiple column-oriented tasks to be processed in parallel reducing the amount of time to respond to a query as compared to other systems that require each column-oriented task in a query be processed serially. For example, a response to a particular query may include a column-oriented task to be performed, such as a column-order function (e.g., mean, median, etc.), for two different columns of stored tables. In such an example, without the ability to process the multiple column-order tasks in parallel, a system would need to seek out the relevant rows for each task in serial fashion in order to gather all of the information for each column. For each task in such a system, the system reads the input table (query) containing the tasks and subsequently performs any local processing, such as processing performed at an access module 110 that may include record counting and gathering the relevant rows needed for a particular task. In such a system, global processing may also be performed, which may include processing that requires communication and coordination between the access modules 110. In this scenario, this sequence of events would occur twice—once for each of the two tasks.

Referring to FIGS. 1 and 2, the RBDMS 102 of FIG. 1 may receive a query 130 from the client computer system 114 via the network 116. The query 130 may include multiple column-oriented tasks $T_1$ through $T_N$ to be performed, where N is the number of unique column-oriented tasks. A parsing engine module 108 may receive the query 130 and may determine that, instead of serially processing each column-order task present in the query 130, the column-oriented tasks may be performed in a parallel fashion using the access modules 110. The basis for such determination is described in additional detail later herein.

Once the determination is made to process the column-oriented tasks in parallel, the parsing engine module 108 receiving the query 130 may generate a processing task for each unique column-oriented task request contained in the query 130. As previously described, each parsing engine module 108 is aware of each access module 110 in the RBDMS 102, which also includes knowledge of which particular data-storage facilities 112 are associated with each access module 110. Such knowledge also allows the parsing engine modules 108 to communicate with specific access modules 110 in order to direct the specific access modules 110 to retrieve associated rows related to some particular query. In the RBDMS 102, the parsing engine module 108 receiving the query 130 may generate a processing task for each unique column-oriented task requested. For example, in FIG. 1, N processing tasks 132, individually designated as $P_1$ through $P_N$, are generated by the parsing engine module $108_{1-1}$ receiving the query 130. Each processing task 132 may be transmitted by the parsing engine module $108_{1-1}$ to the access modules 110 relevant to each processing thread 132.

Referring to FIG. 2, in the example of the query 130, the processing thread $P_1$ may be associated with rows specific to the access modules $110_{1-1}$ through $110_{1-4}$ and may be sent by the parsing engine module $108_{1-1}$ to those access modules 110. Each access module $110_{1-1}$ through $110_{1-4}$ may perform any local processing necessary to carry out the column-oriented task, such as counting the particular rows, as well as retrieving the rows containing columns associated with the processing tasks 132. The access modules 110 may repartition the retrieved information into columnar format in order to carry out a particular column-oriented task. The other processing threads $P_2$ through $P_N$ may be sent to other access modules 110 for similar local processing. The example provided is merely for purposes of illustration. In other scenarios, any combination of access modules 110 within the RBDMS 102 may receive one or more processing tasks 132 in order to perform the local processing necessary to carry out a column-oriented task.

As the access modules 110 complete the local processing, the access modules 110 may communicate with one another at the direction of the parsing engine module 108 handling the query in order to transfer the retrieved data allowing the data to be organized in order to proceed with the column-oriented tasks. In one example, the access modules 110 may be grouped into subsets by the parsing engine module 108 according to particular column-oriented task and those grouped access modules 110 will perform the necessary processing to carry out the particular column-oriented task. Thus, each particular processing thread 132 may be transmitted to access modules 110 associated with columns as requested by the processing thread 132, as well as access modules 110 that are designated for processing the columns associated with the particular column-oriented task. This processing performed amongst the access modules 110 may conclude with the results being aggregated and returned to the parsing engine module $108_{1-1}$ for preparation of a results set to be transmitted to the client computer system 114 in response to the query 130. In one example, the number of columns necessary to perform all of the column-oriented tasks 130 of the query may be the same number of access modules 110. In such a scenario, each access module 110 would be associated with a respective processing task 132 to process.

As previously mentioned, a determination may be made upon receipt of the query 130 as to whether the column-oriented tasks in the query 130 should be carried out by repartitioning the rows into columnar format or processing the retrieved rows without repartitioning taking place. In one example, this determination may be made by the optimizer module 120 of the parsing engine module 108 receiving the query 130. Such determination may be based on the optimizer module 120 determining if one or more preexisting conditions exist in order to reparation retrieved rows for column-oriented tasks. For example, a predetermined condition may be threshold-based regarding characteristics of the query, such as the number of unique column-oriented tasks in the query or the number of rows associated with the column-oriented tasks in the query. If the relevant number (e.g., number of rows, number of tasks, etc.) exceeds a predetermined threshold, the optimizer module 120 may determine that the column-order tasks are to be processed in parallel. In alternative examples, the predetermined conditions may be related to various characteristics of interest, such as those contributing to the cost-based analysis performed by the optimizer module 120 in determining a plan for executing a query, for example.

Figure 3:
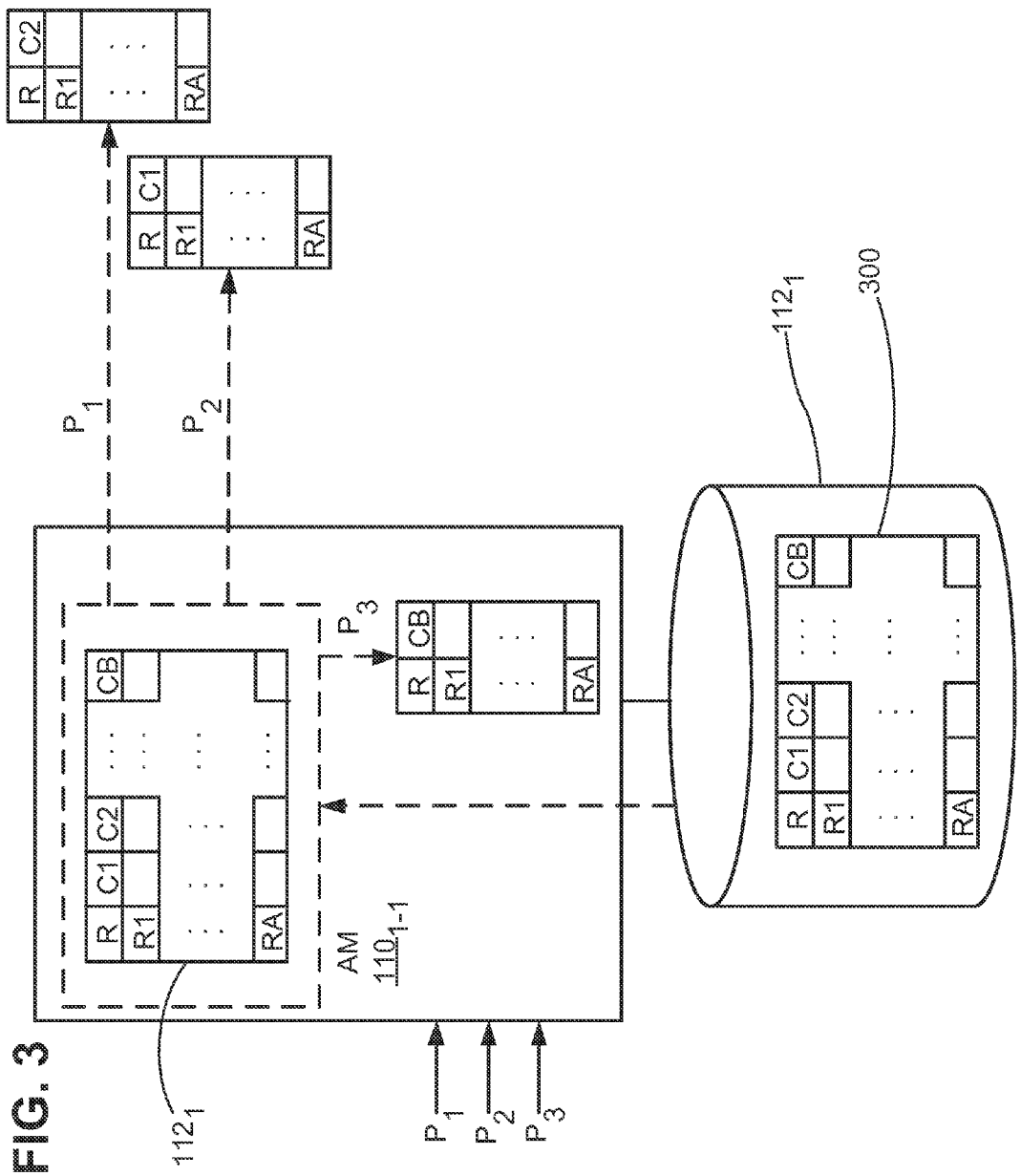
FIG. 3 is a block diagram of an example operation of a portion of the database system of FIG. 1

FIG. 3 is an example block diagram illustrating operation of the access module $110_{1-1}$ upon receipt of various processing tasks 132. In one example, the access module $110_{1-1}$ may be associated with rows R1 through RA of a table 300, where A is the number of rows. The table 300 may include columns 1 through B. In the example of FIG. 3, the access module $110_{1-1}$ may receive three processing tasks P1, P2, and P3. Processing tasks P1, P2, and P3 may be associated with a column-oriented task associated with columns C1, C2, and CB, respectively, of the table 300. The parsing engine 108 handling the query including the processing tasks P1, P2, and P3 may direct other access modules 110 other than the access module $110_{1-1}$, while the access module $110_{1-1}$ may be involved with the processing task P3.

In such an example scenario, the access module $110_{1-1}$ may receive the processing tasks P1, P2, and P3. The access module $110_{1-1}$ may retrieve rows from the table 300 that are involved with the respective processing tasks P1, P2, and P3. In this case, the access module $110_{1-1}$ may retrieve rows R1 through RA since all rows include columns relevant to the processing tasks P1, P2, and P3. Upon retrieval of the rows R1 through RA, the access module $110_{1-1}$ may repartition the rows R1 through RA in accordance with the processing tasks P1, P2, and P3. In this case, the access module $110_{1-1}$ may repartition the rows R1 through RA into at least three columns C1, C2, and CB. Upon repartitioning, the access module $110_{1-1}$ may transmit the columns C1 and C2 to an access module 110 responsible for carrying out the processing tasks P1 and P2 respectively. The access module $110_{1-1}$ may keep column CB, which is associated with the processing task P3. In one example, the access module $110_{1-1}$ may receive additional column rows of column CB depending on the distribution determined by the parsing engine 108.

With reference to FIGS. 4 and 5 and with regard to the example query 130, the parsing engine module $108_{1-1}$, having previously established a session with the client computer device 114 through the session control module 400, receives the query 130. Upon receipt of the query 130, the parser module 402 may perform actions associated with the interpreter module 500, syntax checker module 502, semantic checker module 504, and the data dictionary checker module 506, in a manner consistent with previously-described functionality of the various modules. The optimizer $120_{1-1}$ and parsing engine module $108_{1-1}$ may perform as previously discussed. The dispatcher 126 may translate the execution plan developed by the optimizer $120_{1-1}$ into steps for execution by the relevant access modules 110.

Figure 6:
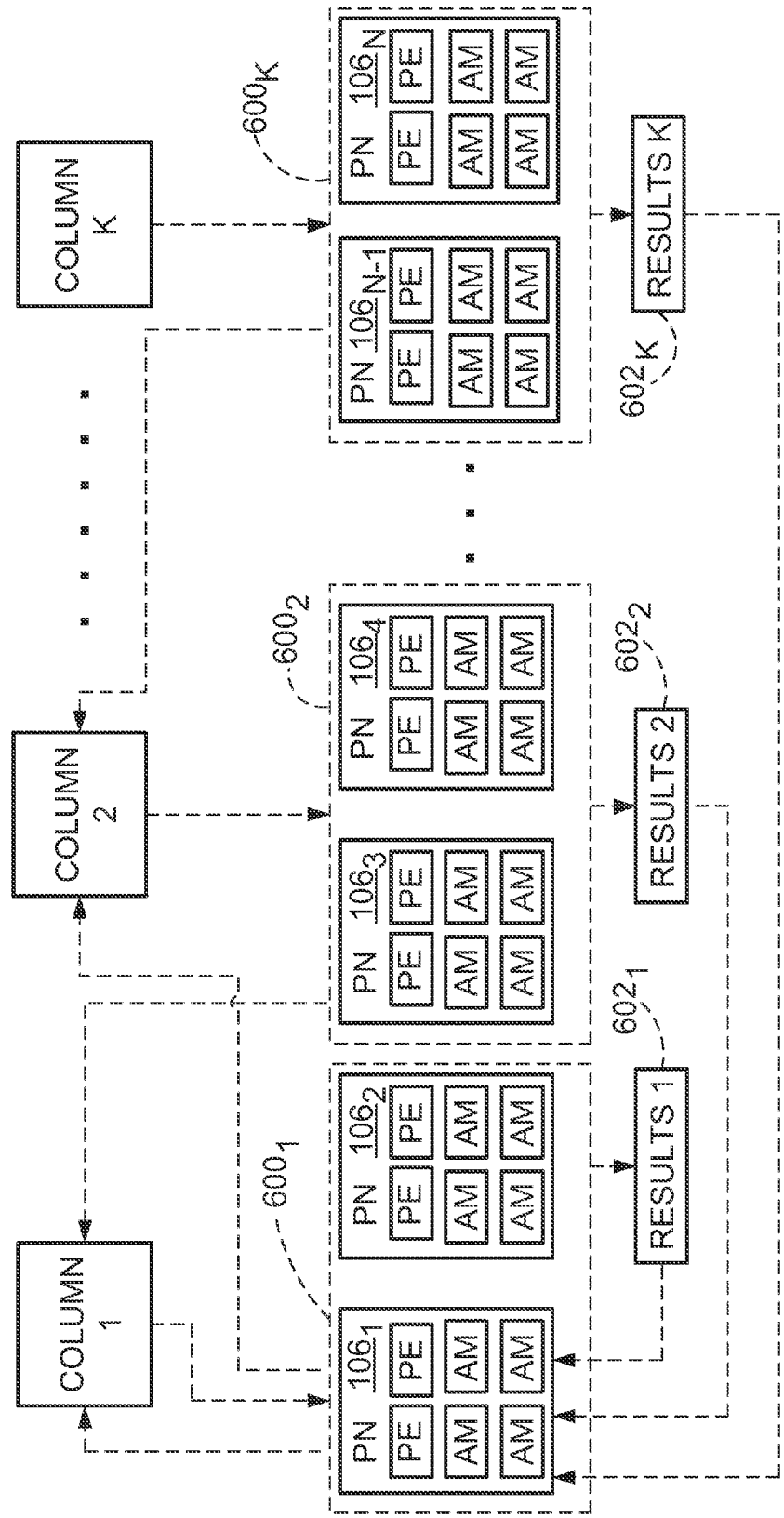
FIG. 6 is a diagrammatic view of example operation of the database system of FIG. 1.

FIG. 6 provides another diagrammatic example of the operation of the RBDMS 102 during a column-oriented task query response. In FIG. 5, a query may include a number K column-oriented tasks requiring that K columns be retrieved for responding to the query. FIG. 6 illustrates one example scenario in which access modules 110 may operate to carry out such column-oriented tasks. In the example of FIG. 6, a parsing engine module 108 (PE) from the processing node $106_1$ may receive the query containing the K column-oriented tasks, and in at least one manner described, determine that the associated column data should be retrieved in order to process the column-oriented tasks in parallel. Upon such determination, the parsing engine module (PE) 108 may generate K processing tasks. Each processing thread may be transmitted to access modules (AM) 110 associated with memory locations storing relevant columns. These access modules 110 may retrieve the rows containing relevant columns. In FIG. 6, each arrow extending from a processing node 106 to a data column (e.g., "column 1") represents that an access module 110 of that processing node 106 is associated with at least a portion of the column being stored in a row. For example, as shown in FIG. 6, access modules 110 of the processing nodes $106_1$ and $106_3$ include column rows associated with column 1.

As previously explained, access modules 110 may be selected by the parsing engine module 108 handling the query 130 to be part of a subset 600 designated to process one column. As shown in FIG. 6, there are K subsets—one for each column to be processed. In FIG. 6, for ease of example, the subsets 600 are illustrated as including all access modules for a particular processing node 106. However, the subsets 600 do not necessarily require that all access modules 110 having a common processing node 106 be included in the same subset 600, nor do all access modules 110 need to be included in the processing of the columns. The number of access modules 110 used to process the columns in parallel may be based on the number of total rows of columnar data being processed. The decision on the number of access modules 110 to use for processing the columns may be determined by the optimizer 120 of the parsing engine module 108 handling the query.

The subsets 600 may process the various columns in parallel in a manner previously described. Upon completion of the column processing, the results 602 of such column processing for each subset 600 may be transmitted to the parsing engine module 108 handling the query. In FIG. 6, K results sets may be generated—one by each subset—and transmitted to the processing node 106 in order to generate the full results set. Upon generation of the full results set (not shown), the parsing engine module 108 may return the results set to the source of the query (e.g., client computer system 114, mainframe 119, etc.)

In another example, a table may be created through the SQL statement:
CREATE TABLE t (id INTEGER, v1 INTEGER, v2 INTEGER)
A parsing engine module 108 may receive a SQL query from the client computer system 114 that includes:
SELECT COUNT(distinct v1), COUNT(distinct v2) from t In systems without the ability to process multiple column-oriented tasks, the two requested "COUNT" functions on columns v1 and v2 would be processed serially. In the RBDMS 102, the parsing engine module 108 receiving the query may determine that repartitioning the row-partitioned data relevant to the query is desired. In response to the determination, the parsing engine module 108 may generate a processing thread for each COUNT (distinct ( )) command. The parsing engine module 108 may communicate with the appropriate access modules 110 so that the access modules 110 may perform local processing such as row counting and relevant column data identification. The access modules 110 may communicate with one another in order to send and receive columnar data repartitioned from the retrieved rows for processing according to the query. In this example, the rows storing the columnar data required for the COUNT (distinct ( )) commands may be retrieved by the access modules 110 associated with the data-storage facilities 112 storing the required columnar data and transmitted to the access modules 110 tasked with performing the COUNT (distinct ( )) functions on the columnar data. These two COUNT (distinct ( )) functions may be performed in parallel by the access modules 110 allowing for a single read of the query. The results may be returned to the client computer system 114.

Figure 7:
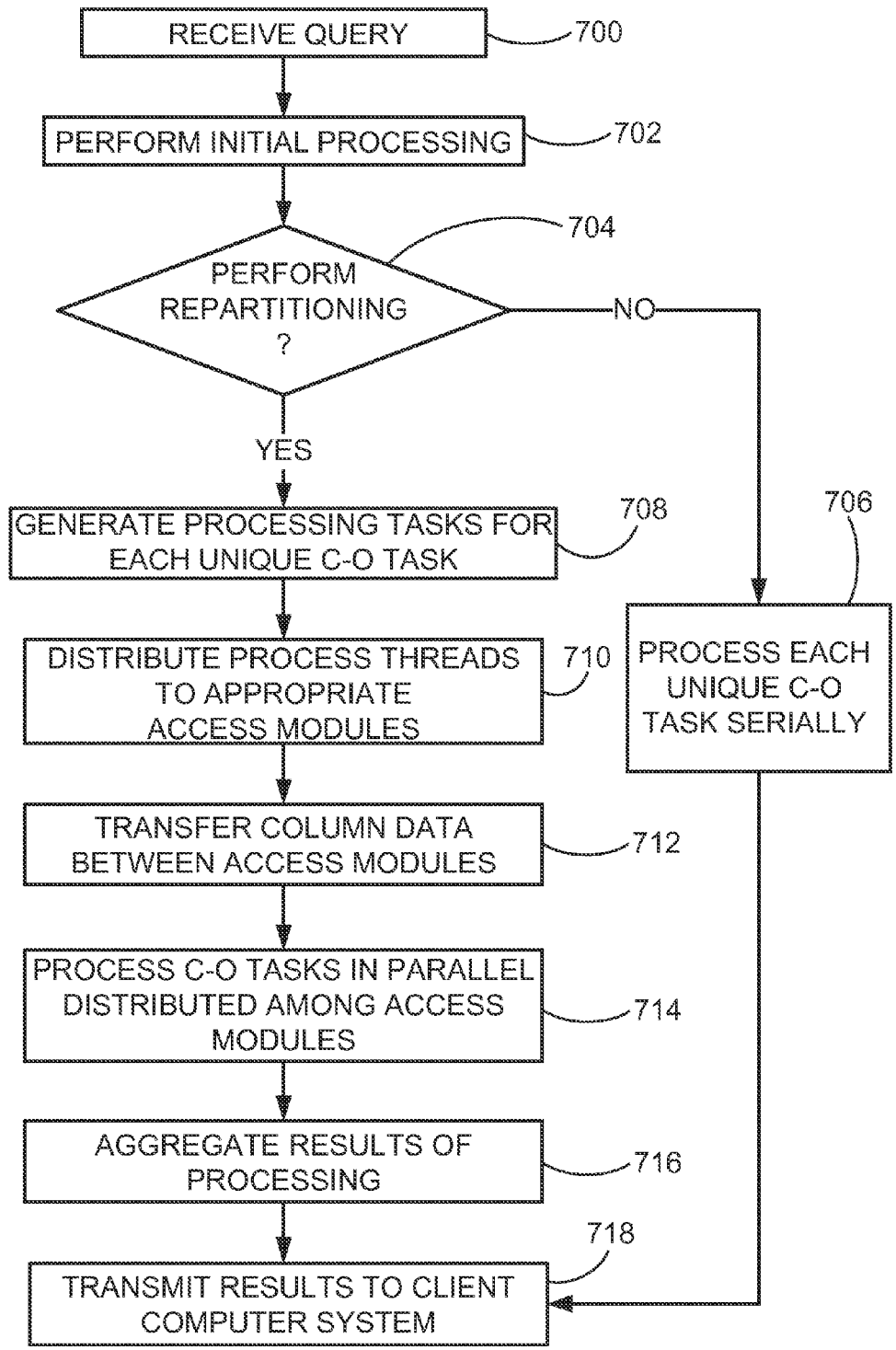
FIG. 7 is an example operational flow diagram of the database system of FIG. 1.

FIG. 7 is an operational flow diagram of the database system 100 in processing a query, such as the query 130. A parsing engine module 108 having an established session with the client computer system 114 may receive the query 130 (700). The parsing engine module 108 may perform initial processing (702), which may include application of the parser module 402. The optimizer module 120 of the parsing engine module 108 may determine if repartitioning data is to be performed (704). In one example, this may include the use of predetermined thresholds, such as those related to the total number of column rows of the columns to be processed and/or the total number of column-oriented tasks requested in the query 130. If the determination is made to forgo repartitioning the column-oriented tasks, the column-oriented (C-O) tasks may be performed serially (706).

If the determination is made to repartition the rows containing columns relevant to the query, the parsing engine module 108 handling the query may generate a processing task 132 for each unique column-oriented task (708). The processing tasks 132 may be distributed to the appropriate access modules 110 in order to retrieve the rows containing associated column data (710). The retrieved column data may be transferred between the access modules 110 for processing (712). In one example, the access modules 110 may be included as part of a subset with each subset being designated to process column data for a particular column. The column-oriented tasks may be processed in parallel by the access modules 110 (714). The results of processing by the access modules 110 may be aggregated by the parsing engine module 108 (716). The aggregated results may be transmitted to the client computer system 114 as part of a results set to the query 130 (718).

FIG. 8 is an operational flow diagram of an example of an access module 110 operation during the processing of the query 130. The access module 110 may receive a processing task 132 distributed from a parsing engine module 108 handling the query 130 (800). Upon receiving the processing thread 132, the access module 110 may perform local processing (802), which may include row counting. The access module 110 may also locate particular column data identified in the processing thread 132 (804). The access module 1110 may reparation the rows containing column data relevant to the query into columnar format (805). The access module 110 may transmit the repartitioned rows containing the columnar data requested in the processing thread 132 (806).

The access module 110 may the repartitioned data from other access modules 110 when the receiving access module 110 is designated by the parsing engine module 108 to be included in a subset associated with a particular column being processed. The access module 110 may process the received column data (810), which may be performed in parallel with other access modules 110 included in the subset, as well as, other access modules 110 included in other subsets. The access module 110 may transmit the processed column data to the parsing engine module 108 (812) in order for the results set to be prepared.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:
1. A database system comprising:
an array of storage devices configured to store a database, wherein the database comprises a plurality of tables stored in the array of storage devices according to a row-based-partitioning protocol; and
a database utilization system executable on at least one processor to:
receive a query comprising at least one request to perform a respective separate action on each of a plurality of data columns stored in the database;
determine, based on presence of a predetermined condition, that each portion of a table that contains the plurality of data columns is to be partitioned based on an association with the plurality of data columns;
in response to the determination of the presence of the predetermined condition, retrieve from the tables that contain the plurality of data columns each row that contains a row of a data column of the plurality of data columns;
partition each retrieved row into individual subsets of one or more data columns, wherein each of the individual subsets of one or more data columns contains at least one of the plurality of data columns; and
distribute each of the individual subsets of one or more data columns to a respective one of a plurality of processing units, wherein each respective processing unit is configured to perform one of the respective separate actions, and wherein the plurality of processing units are configured to perform in parallel a respective separate action on each of the plurality of data columns contained in the distributed individual subsets of one or more data columns.

2. The database system of claim 1, wherein the database utilization system further comprises the plurality of processing units, wherein at least one of the plurality of processing units is configured to, in response to the determination, generate a processing task for each respective separate action, wherein each processing task is used by the at least one of the plurality of processing units to retrieve each row that contains a row of a data column of the plurality of data columns.

3. The database system of claim 2, wherein the plurality of processing units comprises a parsing engine module and a plurality of access modules, wherein each of the plurality of access modules is associated with a respective portion of storage in the storage devices, wherein, based on the determination, the parsing engine module is executable by the processor to transmit the processing tasks to each of the plurality of access modules associated with the respective portion of storage in the storage devices storing at least a portion of the plurality of data columns.

4. The database system of claim 3, wherein the parsing engine module is further executable by the processor to designate subsets of the plurality of access modules, wherein each subset is configured to perform one of the respective separate actions.

5. The database system of claim 4, wherein the parsing engine module is further executable by the processor to transmit each processing task to the subset configured to perform the associated respective separate action.

6. The database system of claim 4, wherein the subsets are configured to perform in parallel.

7. The database system of claim 1, wherein the predetermined condition is a total number of rows that contain a row of a data column of the plurality of data columns being greater than a predetermined number of rows.

8. The database system of claim 1, wherein the predetermined condition is a total number of respective separate actions being greater than a predetermined number of respective actions.

9. A computer-implemented method of operating a database, the method comprising:
receiving a query comprising requested actions to be separately performed on different data columns of a plurality of data columns;
generating a processing task for each requested action;
retrieving rows containing at least one row of a data column of the plurality of data columns, wherein the rows are from at least one row-partitioned data table stored in a storage device;
partitioning each retrieved row into individual subsets of one or more data columns, wherein each of the individual subsets of one or more data columns contains a data column from the plurality of data columns; and
performing the requested actions on the plurality of data columns in parallel based on the processing tasks.

10. The method of claim 9 further comprising determining that the rows of at least one row-partitioned data table stored in a storage device are to be partitioned based on a predetermined condition.

11. The method of claim 10, wherein the predetermined condition is a total number of rows containing at least one row of a data column of the plurality of data columns being greater than a predetermined number of data column rows.

12. The method of claim 10, wherein the predetermined condition is a total number of the requested actions being greater than a predetermined number of requested actions.

13. The method of claim 9 further comprising:
grouping, with the processor, a plurality of processing units into subsets; and
designating, with the processor, each of the subsets of the processing units to perform one of the requested actions.

14. The method of claim 13, wherein the designating, with the processor, each of the subsets comprises designating, with the processor, each of the subsets of the processing units to perform a respective one of the requested actions in parallel with one another.

15. A non-transitory computer-readable medium encoded with a plurality of instructions executable with a processor, the plurality of instructions comprising:
instructions to receive a query comprising requested actions to be separately performed on a plurality of different data columns included in a plurality of tables comprising rows stored according to a row-based-partitioning protocol;
instructions to generate a processing task for each requested action based on a predetermined threshold;
in response to the processing tasks, instructions to retrieve from the plurality of tables each row that contains a column of a data column of the plurality of data columns, wherein the rows are included in the plurality of tables stored;
instructions to partition each retrieved row into individual subsets of one or more data columns, wherein each of the individual subsets of one or more data columns contains at least one of the plurality of data columns; and
instructions to separately perform the requested actions on each of the plurality of data columns of based on the processing tasks.

16. The non-transitory computer-readable medium of claim 15,
wherein the instructions to generate a processing task for each requested action based on a predetermined threshold comprise:
instructions to determine a total number of rows that contain a row of a data column of the plurality of data columns;
instructions to determine that the total number of rows that contain a row of a column of the plurality of data columns is greater than a predetermined number of rows; and
instructions to generate a processing task for each requested action in response to the total number of rows that contain a column row of the plurality of data columns being greater than the predetermined threshold.

17. The non-transitory computer-readable medium of claim 15, wherein the instructions to generate a processing thread for each requested action based on a predetermined threshold comprise:
instructions to determine a total number of requested actions;
instructions to determine that the total number of requested actions is greater than a predetermined number of requested actions; and
instructions to generate a processing task for each requested action in response to the total number of requested actions being greater than the predetermined number of requested actions.

18. The non-transitory computer-readable medium of claim 15,
wherein the plurality of instructions further comprises:
instructions to select a plurality of processing unit subsets; and instructions to designate each of the processing unit subsets to perform a respective one of the requested actions.

19. The non-transitory computer-readable medium of claim 18, wherein the plurality of instructions further comprises instructions to direct each processing thread to the processing unit subset designated to perform the associated respective one of the requested actions.

20. The computer-readable medium of claim 15, wherein the instructions to perform the requested actions based on the processing threads comprise instructions to perform the requested actions in parallel.

21. A method of operating a virtual processor of a database system configured to store a plurality of data tables according to a row-partitioning protocol, the method comprising:
   receiving, with the virtual processor, a first processing task;
   retrieving from a data table, with the virtual processor, at least one row that contains at least one data column of the data table based on the processing task;
   partitioning, with the virtual processor, the at least one row into individual subsets of one or more data columns, wherein at least one of the individual subsets is associated with the processing task;
   transmitting, with the virtual processor, the at least one of the individual subsets to another virtual processor;
   receiving, with the virtual processor, another individual subset of one or more columns from another row of the data table;
   receiving, with the virtual processor, a second processing task; and
   processing, with the virtual processor, the another individual subset of one or more columns from another row of the data table according to the second processing task, wherein at least a portion of the processing by the virtual processor occurs during processing by the other virtual processor of the at least one of the individual subsets according to the first processing task.

* * * * *